United States Patent [19]

Keller et al.

[11] 4,123,315

[45] Oct. 31, 1978

[54] MACHINE FOR ASSEMBLING WOOD I-BEAMS

[75] Inventors: James R. Keller, Tualatin; William A. Nickerson, Portland, both of Oreg.

[73] Assignee: Wm. A. Nickerson & Co., Ltd., Tualatin, Oreg.

[21] Appl. No.: 809,176

[22] Filed: Jun. 23, 1977

Related U.S. Application Data

[63] Continuation-in-part of Ser. No. 743,532, Nov. 5, 1976, Pat. No. 4,074,498, which is a continuation-in-part of Ser. No. 558,350, Mar. 14, 1975, Pat. No. 3,991,535.

[51] Int. Cl.[2] .......................... B26D 1/10; B32B 31/00

[52] U.S. Cl. .................................... 156/560; 100/153; 100/176; 144/2 R; 144/242 C; 144/309 D; 144/317; 156/559

[58] Field of Search .................. 52/729; 156/559, 560, 156/313, 543; 100/153, 154, 152, 151, 176; 144/2 R, 3 R, 242 R, 246 R, 246 A, 249 R, 249 B, 309 D, 309 L, 315 R, 317, 242 A, 242 C

[56] References Cited

U.S. PATENT DOCUMENTS

| | | | |
|---|---|---|---|
| 3,011,248 | 12/1961 | Gilkey | 144/2R |
| 3,060,980 | 10/1962 | Cook | 144/315 R X |
| 3,616,091 | 10/1971 | Troutner | 144/315 R |
| 3,894,908 | 7/1975 | Troutner et al. | 194/315 R X |

*Primary Examiner*—Othell M. Simpson
*Assistant Examiner*—W. D. Bray
*Attorney, Agent, or Firm*—Lee R. Schermerhorn

[57] ABSTRACT

The leading ends of a tongued web member and a pair of grooved chord members are moved longitudinally against stops, with the trailing ends of the chord members spread apart in divergent relation. A pair of opposed pistons presses the leading ends of the chord members toward the opposite side edges of the web member, forcing the tongues on the web member into the grooves of the chord members, which grooves have previously been coated with glue. Then the stops and pistons are retracted and the three members, thus joined together at their leading ends, are advanced between a pair of rubber tired drive wheels, meanwhile allowing the divergent trailing ends of the chord members to swing toward each other as the members progress through the drive wheels. The drive wheels are power driven to feed the assembled beam through sizing rollers which progressively squeeze the chord members toward each other as may be necessary to produce a beam of predetermined width dimension.

9 Claims, 7 Drawing Figures

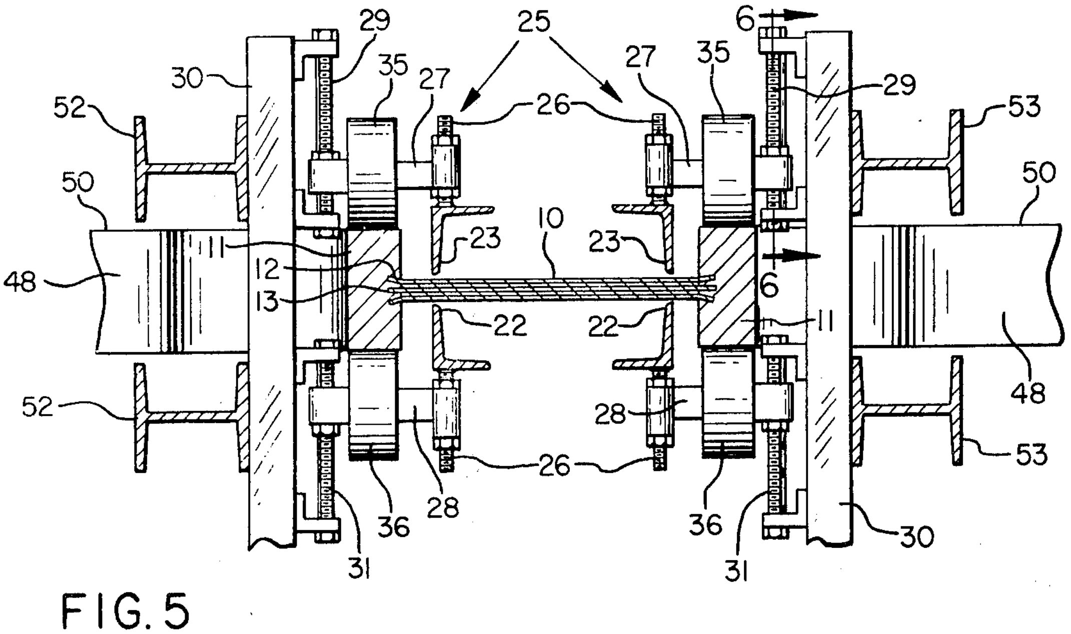
FIG. 5
FIG. 6
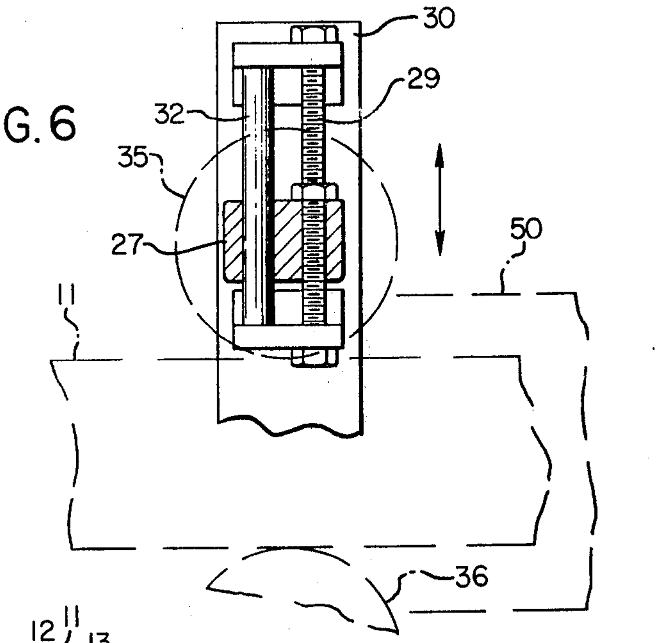
FIG. 3
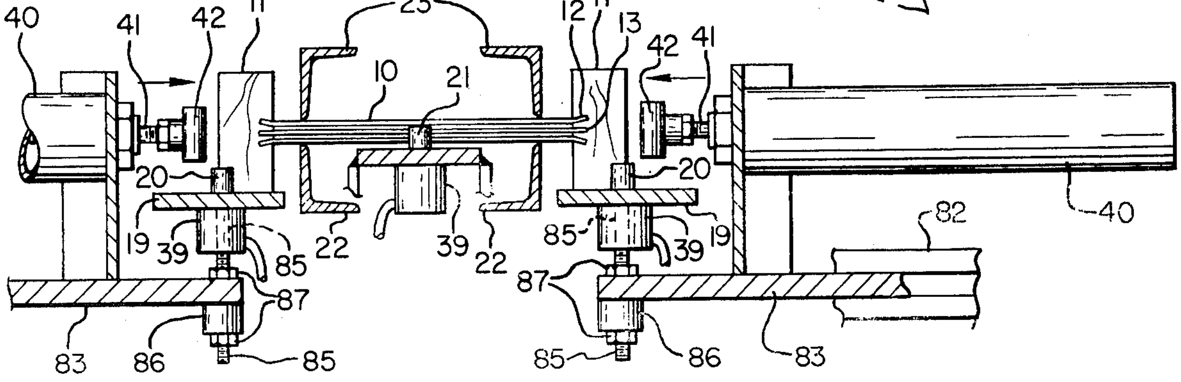

MACHINE FOR ASSEMBLING WOOD I-BEAMS

CROSS-REFERENCES TO RELATED APPLICATIONS

This application is a continuation-in-part of Ser. No. 743,532 filed Nov. 5, 1976 for FABRICATED WOOD BEAM, now U.S. Pat. No. 4,074,498; which is a continuation-in-part of Ser. No. 558,350, filed Mar. 14, 1975 for PRESSED-IN DOVETAIL TYPE JOINT, now U.S. Pat. No. 3,991,535.

BACKGROUND OF THE INVENTION

This invention relates to a machine for assembling wood I beams wherein a pair of wood chord members having glue coated grooves are pressed onto the tongues of web members When the tongue and groove joints between the web and chord members are of the dove tail type requiring bending of the tongues as shown in our U.S. Pat. No. 3,991,535 on Pressed-in Dovetail Type Joint and our application Ser. No. 743,532 filed Nov. 5, 1976 on Fabricated Wood Beam, now U.S. Pat. No. 4,074,498 considerable pressure is required to insert the tongues and bend them into conformity with the angled grooves. Prior to the present invention no apparatus was known that would satisfactorily perform this function.

Objects of the present invention are therefore to provide an improved machine for assembling wood I beams, to provide a machine for assembling wood I beams having dovetail type tongue and groove joints, to provide a machine which is readily adjustable to different dimensions of stock and to provide a machine for the purpose described which is of relatively simple and inexpensive construction and which will perform effeciently for factory production of the I-beams.

SUMMARY OF THE INVENTION

In the operation of the present machine the leading ends of a tongued web member and a pair of grooved chord members are moved longitudinally against stops, with the trailing ends of the chord members spread apart in divergent relation. A pair of opposed pistons presses the leading ends of the chord members toward the opposite side edges of the web member, forcing the tongues on the web member into the grooves of the chord members, which grooves have previously been coated with glue.

Then the stops and pistons are retracted and the three members, thus joined together at their leading ends, are advanced between a pair of resilient drive wheels, meanwhile allowing the divergent trailing ends of the chord members to swing toward each other as the members progress through the drive wheels. The drive wheels are power driven to feed the assembled beam through sizing rollers which progressively squeeze the chord members toward each other as may be necessary to produce a beam of predetermined width dimension.

Additional objects and advantages will become apparent and the invention will be better understood from the following detailed description of the preferred embodiment illustrated in the accompanying drawings. Various changes may be made in the details of construction and arrangement of parts and certain features may be used without others. All such modifications within the scope of the appended claims are included in the invention.

BRIEF DESCRIPTION OF THE DRAWINGS

FIG. 3 is a view on the line 3—3 in FIG. 1.

FIG. 5 is a view on the line 5—5 in FIG. 1.

FIG. 6 is a view on the line 6—6 in FIG. 5.

DESCRIPTION OF THE PREFERRED EMBODIMENT

Figure 1:
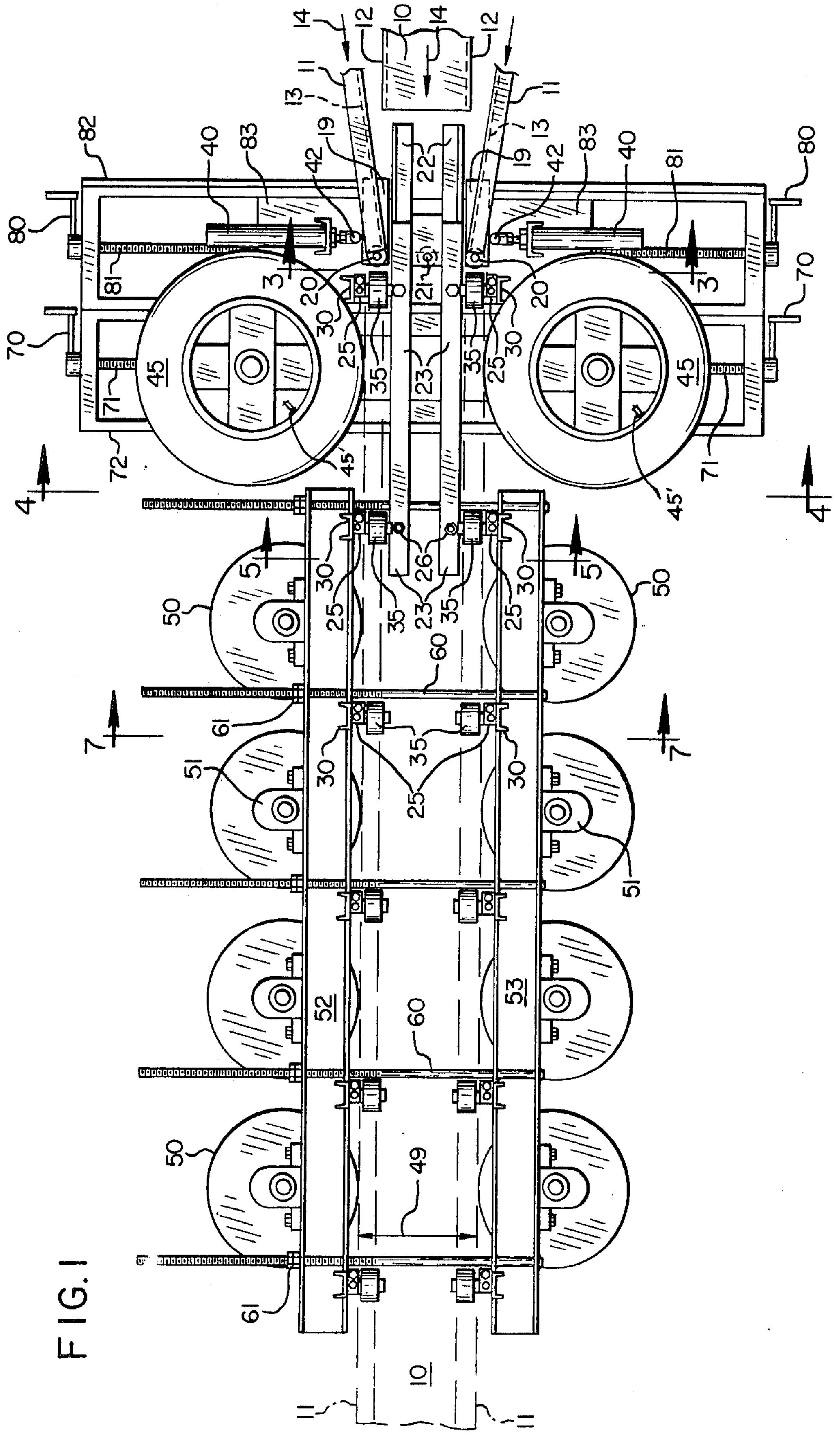
FIG. 1 is a top plan view of a machine embodying the invention.

With reference to FIG. 1 an I-beam is made in the present machine by assembling a web member 10 between a pair of chord members 11 by means of glued tongue and groove joints. Thus the web member 10 has longitudinal tongues 12 on its opposite side edges and the chord members 11 have longitudinal grooves 13 in their confronting faces to receive the tongues 12. The I-beam is assembled in horizontal position with web member 10, which is a flat sheet of material, disposed in a horizontal plane.

Such beams have various uses in building construction and for other purposes. For example, in building construction they may be used as floor joists and as headers over door and window openings in walls. In such uses the beam extends in a horizontal direction with the web member 12 in a vertical plane and the chord members 11 disposed on the top and bottom edges of the web member. Also the beams may extend in vertical directions to serve as wall studs or supporting columns.

By way of example, web member 10 is illustrated in FIG. 3 as a five-ply strip of plywood in which the direction of the grain in the middle and face veneers is transverse to the length of chord members 11, with the grain in the intervening veneers parallel with the length of the chord members. Thus, the direction of the grain in the tongues 12 is perpendicular to the direction of grooves 13 and when the two outermost grooves 13 are in divergent relation from top to bottom as shown in FIG. 3 considerable force is required to insert the tongues in the grooves and bend the outer tongues to conform to the angles of the divergent grooves.

Web member 10 may be three-ply plywood as shown in said U.S. Pat. No. 3,991,535 or it may be made of five-ply or seven-ply if desired. Web member 10 may also be made of particle board or other suitable structural material. There may be two such web members face to face as shown in said application Ser. No. 743,532 wherein a considerable number of tongues must be accurately aligned with and pressed into the chord grooves. The chord members 11 are ordinarily dimension lumber or laminated wood products.

The present machine is, of course, not limited to the manufacture of beams having dovetail type joints. The machine is also of advantage in making similar fabricated structures with other types of tongue and groove joints.

Figure 7:
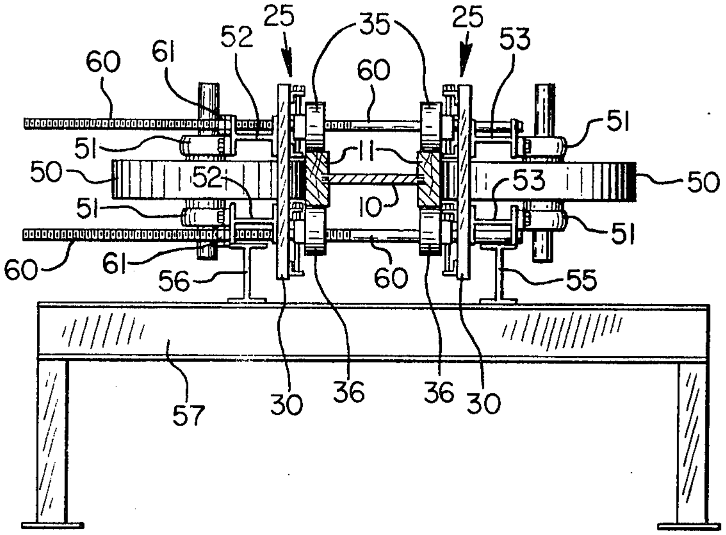
FIG. 7 is a view on the line 7—7 in FIG. 1.
Figure 4:
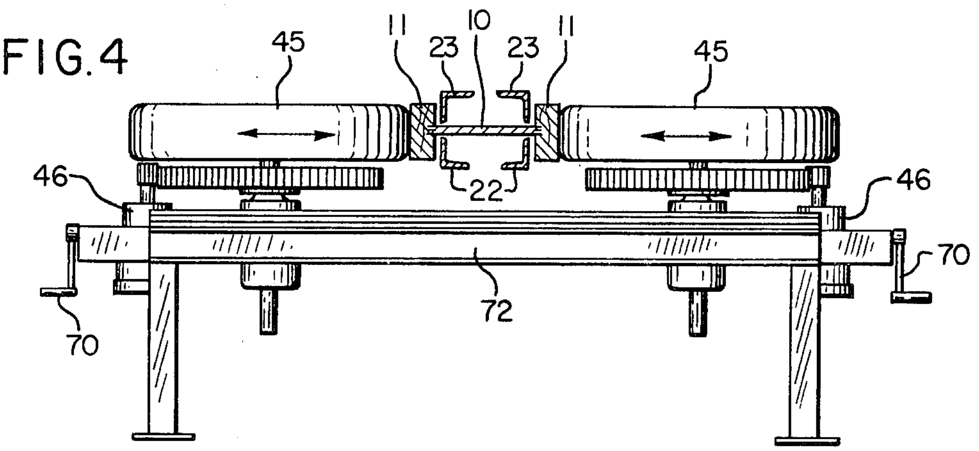
FIG. 4 is a view on the line 4—4 in FIG. 1.

FIG. 5 also shows the tongue and groove joint 12, 13 in detail. FIGS. 4 and 7 are on too small a scale to show this detail but it is to be understood that the joints are the same as described in connection with FIG. 3.

Referring now to FIGS. 1 and 3, the leading ends of chord members 11 are rested on support plates 19 and manually advanced longitudinally into contact with retractable stop pins 20 with the trailing ends of the members spread apart in divergent relation to provide open space between them for manipulating web member 10. Web member 10 is advanced manually until its leading end encounters retractable center stop pin 21. During this movement the leading end of web member 10 is supported on a pair of lower rails 22 and passed under a pair of upper rails 23. Thus the stops 20 and 21 hold the leading ends of the chord and web members in proper position and alignment for the first step of the assembly operation.

Web supports 22 and 23 are mounted on four adjustable supports 25 in FIG. 1, the details being shown in FIG. 5. Each support 25 comprises a pair of vertical screws 26 connected to the respective rails 22 and 23 for individual height adjustment. Upper screws 26 are mounted in an upper horizontal bracket 27 and lower screws are mounted in a lower horizontal bracket 28. Upper bracket 27 may be raised and lowered by a vertical screw 29 on a vertical bracket 30 and lower bracket 28 is similarily adjustable by screw 31. Each bracket 27 and 28 slides on a vertical guide pin 32 as shown in FIG. 6.

Upper bracket 27 also carries an upper roller 35 to roll on the top surface of chord member 11 and lower bracket 28 carries a lower supporting and guide roller 36 to roll on the bottom surface of chord member 11. Both rollers 35 and 36 are idle rollers. Thus, screws 29 raises and lowers both the upper guide rail 23 and upper roller 35 in unison and screw 31 raises and lowers lower guiderail 22 and lower roller 36 in unison while the screws 26 adjust the guide rails relative to the respective rollers. Chord support plates 19 are also mounted on the lower brackets 28 on the first supports 25 at the right end of FIG. 1.

One chord member 11 may be wider, in a vertical direction in FIG. 5, than the other chord member, requiring different adjustments of screws 26, 29 and 31 on opposite sides of the machine. Also, the present arrangement allows the web 10 and grooves 13 to be placed off center in chord members 11, if desired.

Referring now to FIG. 3 it will be observed that the stop pins 20 and 21 are raised and retracted by individual pneumatic cylinders 39. Just ahead of these stop pins is a pair of transverse pneumatic cylinders 40 each having a piston rod 41 with a shoe 42 to engage the back side of a chord member 11. Thus the piston rods 41 force the leading ends of chord members 11 onto the tongues 12 at the leading end of web member 10 while the three members are positioned against the stop pins 20 and 21 with their trailing ends in divergent relation as shown in FIG. 1.

Piston rods 41 are then immediately retracted and the web and chord members 10 and 11, which are now connected together at their leading ends, are manually advanced between a pair of resilient drive wheels 45 as shown in FIG. 4. Wheels 45 preferably comprise pneumatically inflated automobile tires driven by reversible hydraulic motors 46. These wheels constitute the only power operated feed means in the machine.

Manual valve control means for the motors 46 allow the web and chord members to be moved forward between the wheels 45 to progressively press the tongues 12 into grooves 13 back from the leading ends of the members. If a web or chord member 10 or 11 is found to be defective, the wheels 45 may be reversed to permit removal and replacement of the defective member.

After leaving the resilient drive wheels 45 the assembled forward end of the beam passes between a series of pairs of sizing rollers 50. The rollers 50 of each successive pair are slightly closer together to gradually press the tongues 12 more deeply into the grooves 13 until the last pair of rollers produce the desired width of beam as indicated by dimension arrow 49 in FIG. 1. For example, the last pair of rollers 50 on the left side of FIG. 1 may be one fourth inch closer together than the first pair of rollers. Rollers 50 may be all metal or they may have solid rubber tread surfaces as indicated at 48 in FIG. 5.

In order to produce a predetermined beam width 49 the tongues 12 are not seated in the bottoms of grooves 13 whereby the beams may be assembled to an accurate width which may be made to correspond to standard dimension lumber.

As seen in FIGS. 1 and 7, the sizing rollers 50 on one side of the machine are mounted on bearing brackets 51 on a pair of upper and lower longitudinal beams 52 and the sizing rollers on the opposite of the machine are mounted on bearing brackets 51 on a pair of upper and lower longitudinal beams 53. The beams 53 are mounted in fixed position on a fixed longitudinal frame member 55 while the beams 52 are mounted on a beam 56 which slides on transverse frame members 57 for lateral adjustment relative to longitudinal frame member 55.

Such adjustment is maintained by nuts 61 on transverse bolts 60 which are welded to the beams 53. Beam assembly 52, 56 is shifted manually for coarse adjustment to make I-beams of different widths corresponding to different sizes of dimension lumber, the nuts 61 providing fine adjustment at five stations along the work flow path to produce the progressive squeezing action described above.

Figure 2:
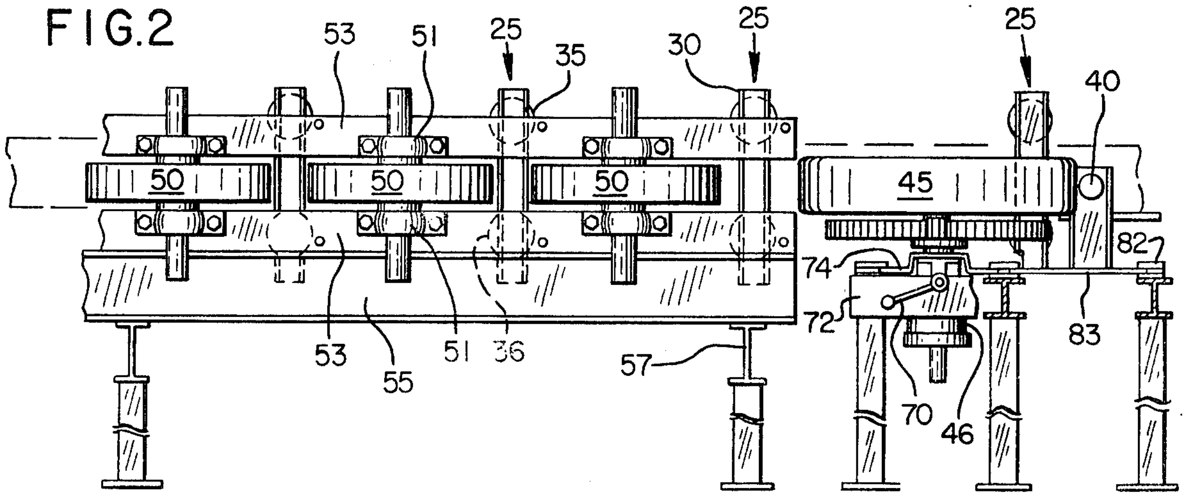
FIG. 2 is a side elevation view.

Drive wheels 45 are individually adjustable laterally by hand cranks 70 in FIGS. 1 and 4. Each hand crank 70 turns a separate screw 71 in a stationary transverse frame 72. Each drive wheel 45 is mounted with its motor 46 on a carriage 74 in FIG. 2 which is slidable on frame 72 by means of its hand crank 70. This provides adjustment of the squeezing force exerted on chord members 11 and in addition the resilience of the wheels may be varied by changing the pneumatic pressure in the rubber tires by means such as the valve stems 45'.

In a similar manner the stop pins 20 and cylinders 40 in FIG. 3 are adjustable laterally by hand cranks 80 in FIG. 1. Each hand crank 80 is mounted on a separate screw 81 in a stationary transverse frame 82 to shift a carriage 83. The left stop pin 20 and left cylinder 40 are mounted on one carriage 83 under the control of the left crank 80 and the right stop pin 20 and right cylinder 40 are mounted on a second carriage 83 under the control of the right crank 80. The vertical brackets 30 for the first pair of supports 25 in FIG. 1 are mounted on carriages 83 while the following supports 25 are mounted on beams 52 and 53.

FIG. 3 also shows how the short chord support plates 19 are mounted for vertical adjustment to correspond to the level of lower rollers 36. Each plate is supported on a vertical screw 85 wich is received in a boss 83 on one of the carriage slides 83, the nuts 87 providing vertical positioning. Cylinders 39 for stop pins 20 are mounted on the under sides of plates 19 with pins 20 projecting through holes in the plates.

The pistons in stop pin cylinders 39 and pneumatic ram cylinders 40 are air actuated and spring retracted. When a preceding I-beam has left the drive wheels 45 the stop pins 20 and 21 are raised to align the leading ends of the next web and chord members 10 and 11 as previously described. Upon operation of ram piston rods 41 the stop pins are retracted to allow said web and chord members to be advanced to drive wheels 45. The drive wheels then cause the new web and chord members to push the preceding I-beam on through the sizing rollers 50.

The machine is also adapted for automated operation wherein the web and core members are positioned by other machine elements and advanced between drive wheels 45 without manual manipulation. Then the stop pins 20 and 21, and ram cylinders and piston rods 40 and 41, are not needed and the frame 82 and associated parts are omitted. In such case the first pair of supports 25 is mounted on frame 72.

What is claimed is:

1. A machine for assembling a pair of grooved wood chord members on opposite side edges of a tongued web member to make an I-beam, said machine comprising means for supporting said web and chord members with tongues on said opposite side edges of said web member in positions to enter grooves in opposed face sides of said chord members, a pair of resilient drive wheels engageable with the opposite sides of said chord members to press said chord members onto said tongues and cause said tongues to enter part way into said grooves, and idle sizing rollers engagable with said opposite sides of said chord members to cause said tongues to enter farther into said grooves to produce a beam of predetermined width measured between said opposite sides of said chord members.

2. A machine as defined in claim 1 including means to vary the resilience of said resilient drive wheels.

3. A machine as defined in claim 1, said drive wheels having pneumatic rubber tires to engage said chord members.

4. A machine as defined in claim 1 including means to vary the spacing of said drive wheels and means to vary the transverse spacing of said sizing rollers.

5. A machine as defined in claim 1 including a pair of opposed fluid pressure operated pistons ahead of said drive wheels arranged to press the leading ends of said chord members onto said tongues before said members are advanced to said drive wheels.

6. A machine as defined in claim 5 including retractable stop pins ahead of said drive wheels for aligning the leading ends of said web and chord members before said pistons are operated.

7. A machine as defined in claim 1 including a series of pairs of said sizing rollers having progressively closer lateral spacing to gradually squeeze said chord members toward each other, the last pair of said rollers producing said predetermined width of beam.

8. A machine as defined in claim 7, said sizing rollers on one side of the machine which engage one of said chord members being mounted on a stationary longitudinal support member and said sizing rollers on the opposite side of the machine which engage the other chord member being mounted on a movable longitudinal support member, and individually adjustable transverse screw means interconnecting said two longitudinal support members to vary the transverse spacing of said sizing rollers.

9. A machine as defined in claim 8 including upper and lower horizontal rollers at intervals along each of said longitudinal support members to support and guide said chord members between said sizing rollers, and individual screw means for vertical adjustment of each of said horizontal rollers.

* * * * *